Aug. 7, 1945. H. M. STUELAND 2,381,318
CLUTCH AND BRAKE ASSEMBLY
Filed Nov. 30, 1942 2 Sheets-Sheet 1
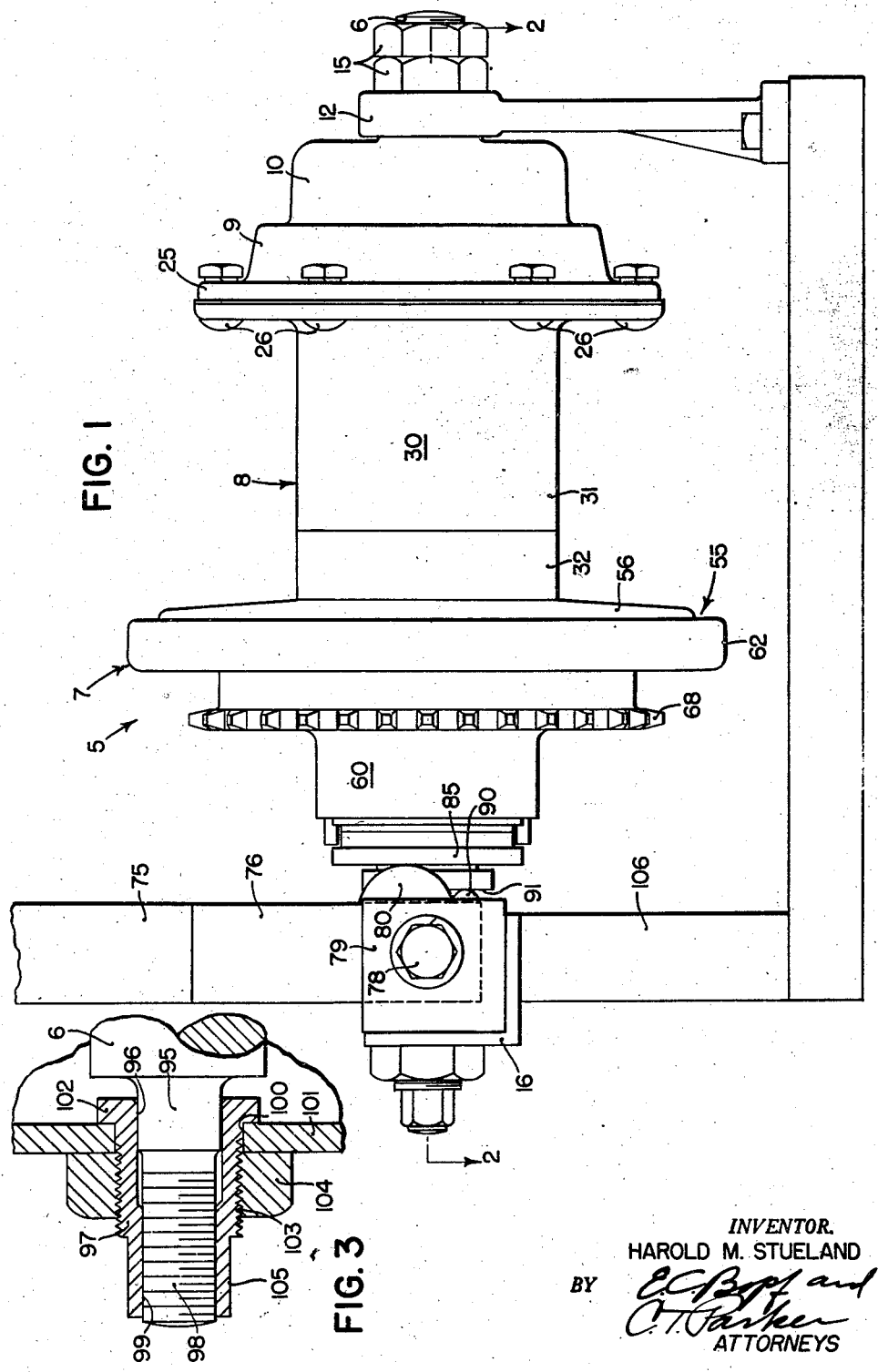
INVENTOR.
HAROLD M. STUELAND
BY
ATTORNEYS

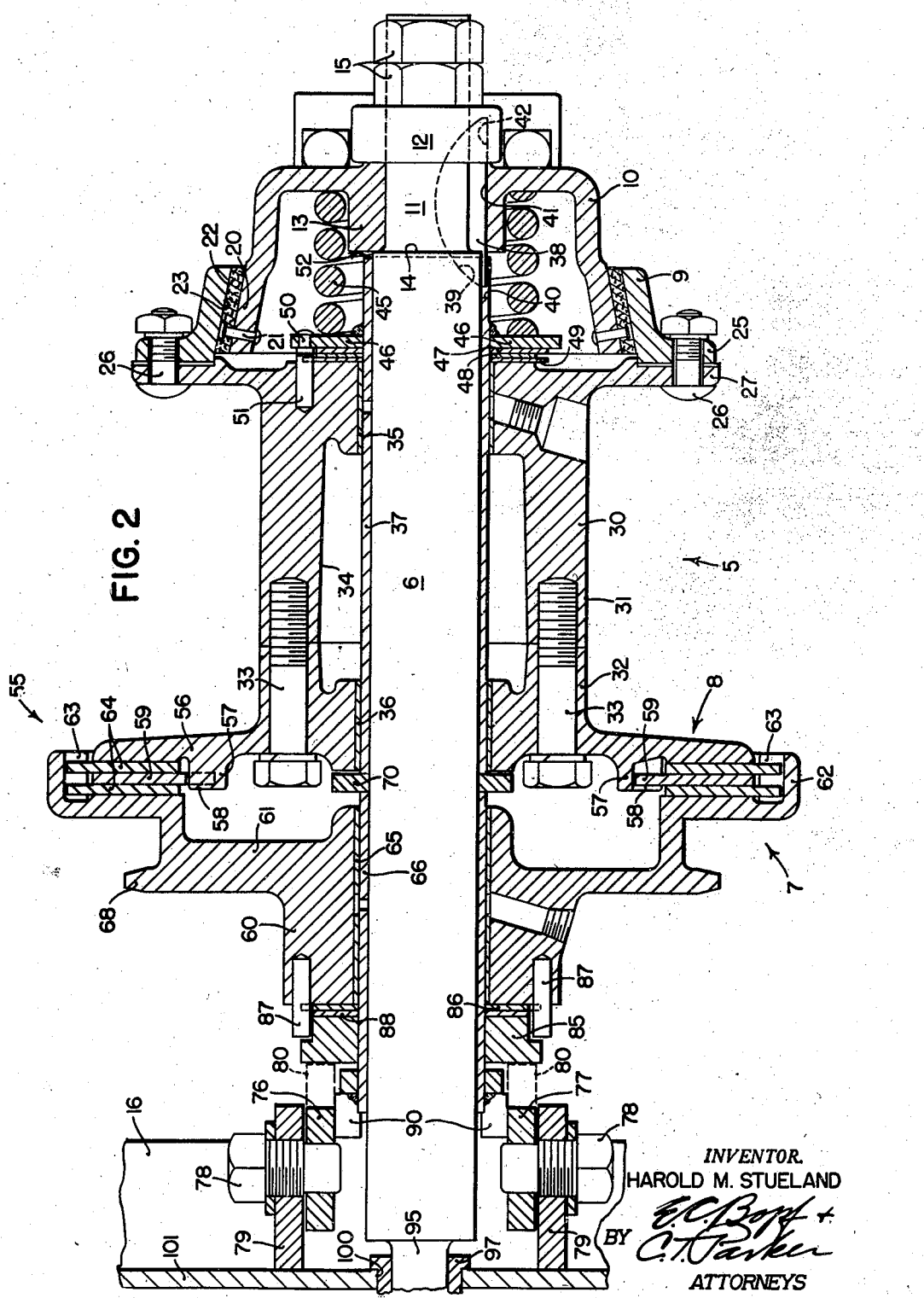

Patented Aug. 7, 1945

2,381,318

UNITED STATES PATENT OFFICE 2,381,318

CLUTCH AND BRAKE ASSEMBLY

Harold M. Stueland, East Moline, Ill., assignor to Deere & Company, Moline, Ill., a corporation of Illinois Application November 30, 1942, Serial No. 467,448

20 Claims. (Cl. 192—18)

The present invention relates generally to clutch and brake assemblies, with particular reference to those used in connection with hoisting mechanism such as, for example, shown and described in U. S. Patent No. 2,298,199, granted to Court and Stueland, October 6, 1942, and is in the nature of an improvement over the clutch mechanism shown in that patent.

The principal object of the present invention relates to the provision of a clutch and brake assembly for hoists or the like, and arranged so that the brake is normally held in braking engagement and is not released until after the clutch members are engaged, and furthermore the clutch members are not released until after the brake elements are engaged. In other words, it is an object of my invention to provide a clutch and brake assembly, with control mechanism which insures that whenever the operator releases the controls, the brake is instantaneously applied. A further object of my invention relates to the provision of a clutch and brake mechanism for a hoist, which is characterized in that whenever the control lever is released from hoisting position, the load is immediately stopped in suspended position, without any tendency for the hoist to slip and let the load drop slightly before the brake is applied. A further feature of my invention is that the brake is released to lower the load by swinging the control lever from the neutral position in a direction opposite to that in which the lever is actuated to raise the load.

Still a further object of this invention relates to the provision of a clutch and brake assembly in which the brake is normally held engaged by a strong spring and is released by the pressure exerted by the operator in engaging the clutch members, with the result that the clutch must be fully engaged before the brake is released. Similarly, when the pressure is relieved from the clutch members, the brake actuating spring which is in opposition to the clutch pressure, engages the brake before the clutch members have disengaged.

Still another object of this invention relates to the provision of mounting means for the control mechanism, which provides for adjustment of the latter to compensate for wear in the clutch and brake frictional surfaces and other parts.

These and other objects and advantages of my invention will be apparent to those skilled in the art after a consideration of the following description, in which reference is had to the drawings appended thereto, in which Figure 1 is a side elevational view of a clutch and brake assembly constituting one embodiment of the present invention;

Figure 2 is a sectional plan view taken along a line 2—2 in Figure 1; and

Figure 3 is a sectional view taken through the adjusting means for adjusting the control lever to compensate for wear in the parts.

Referring now to the drawings, the clutch and brake assembly is indicated in its entirety by reference numeral 5 and comprises generally a stationary supporting shaft 6, on which are rotatably supported a pair of driving and driven clutch members 7, 8, respectively, and a pair of engageable brake elements 9, 10, attached to the driven element 8 and to the stationary shaft 6, respectively.

One end of the stationary shaft 6 is reduced in diameter as indicated at 11 and is supported in a bracket 12. The stationary brake element 10 is in the form of a bell shaped member having a hub 13 adapted to receive the reduced portion 11 of the end of the shaft, and abuts a shoulder 14 on the latter. A pair of lock nuts 15 are threaded on the end of the shaft and draw the shaft and hub 13 tightly against the bracket 12.

The opposite end of the stationary shaft 6 is adjustably mounted on a structural angle support 16, by means which will be described later in more detail.

The bell shaped brake element 10 is provided with an outwardly flared flange or skirt portion 20, which serves as a brake drum, the outer surface of which is covered with a friction producing material of any known substance of which brake lining material is made. This material is firmly attached to the outwardly flared brake drum portion 20 by means of suitable rivets 21, or by any other means which is suitable for this purpose. Thus, the outer surface 22 of the braking material is frustoconical in shape and is adapted to engage the cooperative inner surface 23 of an axially extending flange on the brake element 9. The interior braking surface 23 is also frustoconical in form and thus by shifting the brake element 9 in a direction away from the bracket 12, it will be evident that the braking surfaces 22, 23 will be wedged together in braking engagement. Conversely, by shifting the brake element 9 axially relative to the drum 20, toward the supporting bracket 12, the braking surfaces can be disengaged. The brake element 9 is provided with a radially extending supporting flange 25, which is rigidly secured by bolts 26 to a radially extending flange 27 adjacent one end of the driven member 8.

The driven member 8 comprises a winding drum 30, which is substantially cylindrical and provides for winding a flexible cable or the like, such as is commonly used for hoists, winches, and other devices to which my invention may be applied. My invention is not limited to winding drums, however, for the driven member may be in the form of a gear or other suitable power transmitting member. As indicated in Figure 2, the drum 30 is formed in two parts 31, 32, divided along a radial plane, and secured together by suitable cap screws 33.

The interior of the drum 30 is hollowed out as at 34, to reduce the weight, and is provided with journal bearings 35, 36 at opposite ends of the drum 30, which are adapted to rotate on a sleeve 37, which closely embraces but is slidable on the stationary shaft 6.

The sleeve 37 is prevented from rotating about the axis of the shaft 6 by means of a large key 38, disposed in a keyway 39 extending longitudinally within the end portion 11 of the shaft 6. The end of the key 38 is received within an axially extending slot 40 in the end of the sleeve 37, thus permitting the latter to be shifted axially along the shaft 6 but prevented from rotating thereabout. The key 38 also extends through aligned slots 41, 42 in the hub 13 of the brake element 10 and the hub of the bracket 12, respectively. Thus, the key 38 prevents relative rotation between the shaft 6, the bracket 12, the brake element 10, and the sleeve 37.

Normally, the brake surfaces 22, 23 are maintained in braking engagement with each other by means of a strong helical spring 45, which encircles the hub 13 and the end of the sleeve 37, exerting a strong continuous force in compression between the inner end of the bell-shaped brake element 10 and a flange plate 46, which extends in a substantially radial plane about the sleeve 37, and is rigidly fixed thereto by any suitable means such as by welding. Three thrust bearing disks 47, 48, 49 encircle the sleeve 37 between the flange 46 and the end of the drum 30 and serve to transmit the force of the spring 45 from the flange 46 to the drum 30, thereby wedging the braking surfaces 22, 23 into firm braking engagement with each other. Thrust bearing washer 47 is prevented from rotating about the axis of the sleeve by means of one or more pins 50 extending through the flange 46 and projecting into slots in the circumference of the washer 47. Likewise, bearing washer 49 is made to rotate about the axis of the sleeve 37 with the drum 30 by means of one or more pins 51 set in the end of the drum 30 and projecting into one or more slots in the circumference of the washer 49. The center washer 48 is circular and can either rotate with washer 49 or stand stationary with washer 47. These particular details of this thrust bearing are not essential in this invention, for any other suitable thrust bearing can be used between the sleeve 37 and the drum 30.

It will be noted that normally the spring 45 presses against the flange 46 urging the sleeve 37 and drum 30 axially outwardly and limited only by the engagement of the braking surfaces 22, 23. In this position of the sleeve 37 it will be noted that there is a small clearance between the end of the sleeve 37 and the end of the hub 13, as indicated at 52 in Figure 2. This clearance provides sufficient movement of the drum 30 and sleeve 37 axially toward the bracket 12 to disengage the braking surfaces 22, 23, to permit the drum to rotate.

The drum 30 is rotated by means of a clutch, indicated generally by reference numeral 55. The end of the drum 30 is provided with a radially outwardly extending flange 56 having an annular rim 57 formed in the end face thereof, to which is attached a plurality of circumferentially spaced radially extending teeth 58, adapted to engage the serrated inner edge of a clutch disk 59 in a manner well-known to those skilled in the art.

The driving clutch member 7 comprises a supporting hub 60, to which is secured a rotor body 61, having an outer axially extending flange 62, provided with a plurality of inwardly extending circumferentially spaced teeth 63 adapted to engage the outer serrated edges of a plurality of driving clutch plates 64, in a manner well-known to those skilled in the art. The hub 60 of the driving member 7 is provided with a journal bearing 65, which is journaled on a sleeve 66, similar to the sleeve 37 and mounted on the shaft 6. The driving clutch member is also slidable axially along the sleeve 66 in order to engage the clutch plates 64 with the driven clutch plate 59 and flange 56. The driving member receives power from a suitable drive chain (not shown), which drives a sprocket 68, which is preferably integrally formed with the driving member 7. Other means for driving the member 7 can of course be used within the scope of my invention.

A thrust washer 70 encircles the shaft 6 between the two sleeves 66 and 37 and is adapted to bear against the adjacent end of the drum 30 when axial pressure is applied thereto through sleeve 66 as will be later described. For all practical considerations, the two sleeves 37 and 66 and washer 70 can be considered as one integral member, and are only made in two parts as shown, to facilitate manufacture and assembly. A slight clearance is provided between the end of the drum and the thrust collar 70 to insure that the drum 30 will rotate freely upon the sleeve 37, when the brake is disengaged.

The clutch and brake assembly is controlled by means of a manual control lever 75, the lower end of which is bifurcated to provide a pair of laterally spaced legs 76, 77, which are pivotally mounted on a pair of trunnion bolts 78, which are supported in coaxial relation in a pair of laterally spaced bracket plates 79 rigidly fixed to the angle member 16 between the horizontal and vertical flanges of the latter. Thus, the lever 75 is pivotally mounted to swing about the axis of the bolts 78, generally in a vertical plane passing through the axis of the supporting shaft 6, toward and away from the clutch. Each of the legs 76, 77 is provided with a cam 80, fixed by any suitable means, such as by welding, to the inner edge of the leg adjacent the driving member 7, and spaced vertically above the axis of the lever pivots 78. The cams 80 are disposed substantially in contact with a thrust collar 85, the latter being mounted on the sleeve 66 and slidable thereon. A thrust washer 86 is disposed adjacent the end of the hub 60 and is made to rotate therewith by means of pins 87 set in the end of the hub 60 and extending through slots in the periphery of the washer 86. A bearing washer 88 is disposed between the washer 86 and the thrust collar 85, thus providing an efficient thrust bearing between the cams 80 on the lever 75 and the driving clutch member 7. It is now evident that when the lever 75 is swung toward the clutch, the cams 80 engage the thrust collar 85 and force the driving clutch member 7 axially toward the clutch driven member 8 to engage the clutch. As axial pressure is applied to the driving member 7 through the lever 75, it is transmitted through the clutch plates, the drum 30, the thrust bearing washers 47, 48 and 49, and the flange 46 to oppose the spring 45 and shift the driving and driven clutch members against the action of the spring 45 to move the brake element 9 out of engagement with the brake drum surface 22. As mentioned before, the limit of movement in this direction is determined by the end of the sleeve 37 engaging the hub 13 of the brake member 10. Since the clearance 52 is only in the order of a sixteenth to an eighth of an inch, it will be evident that the brake releases almost simultaneously with the engagement of the clutch, but nevertheless, the clutch must be in full engagement before the brake is disengaged. Therefore, there is no point in the range of the lever 75 between neutral and clutch engaged position, in which the drum is free to rotate. After the sleeve 37 engages the hub 13, any desired amount of pressure can be applied to the clutch without further compression of the spring 45.

When the lever 75 is swung in the opposite direction from its neutral position, away from the clutch mechanism, the brake is released without engaging the clutch and thereby releasing the winding drum 30 so that it is free to rotate about the axis of the shaft 6. This is accomplished by means of a second pair of cams 90, fixed to the lower ends of the legs 76, 77 on the inner surfaces thereof, by any suitable means such as by welding. The cams 90 are offset below the pivot axis of the bolts 78 and are also offset inwardly from the cam 80, so that they are adapted to engage a plate 91, which is disposed in a transverse vertical plane and is apertured to receive the end of the sleeve 66, the latter being rigidly welded or otherwise fixed to the plate 91. Thus, by swinging the lever away from the clutch mechanism, the cams 90 engage the plate 91 and force the sleeve 66 inwardly, transmitting pressure through the collar 70, the sleeve 37, and the flange 46, to oppose the spring 45 and press the latter until the end of the sleeve 37 abuts the end of the hub 13. During this movement, the collar 70 engages the end of the drum 30 and shifts the latter axially, thereby separating the braking surfaces 22, 23, as described above. Inasmuch as movement of the lever away from the clutch mechanism also moves the cams 80 away from the thrust collar 85, no pressure is applied to the driving member 7, and therefore no engagement of the clutch plates 59, 64, occurs. When the lever 75 is returned to its neutral position, pressure is relieved from the spring 45, whereby the latter shifts the drum 30 axially of the shaft 6 and reapplies the brake to hold the drum stationary.

The operation of this embodiment of my invention, as applied to a hoist, is as follows: To lift the load, the drum is rotated in order to wind cable thereon, by swinging the lever 75 toward the clutch mechanism, thereby applying pressure to the thrust collar 85 and shifting the driving member 7 axially into engagement with the driven member 8, pressure being applied through the clutch plates 59, 64, and through the drum 30, the thrust bearing plates 47, 48, 49, and the flange 46, in direct opposition to the pressure of the spring 45, thereby shifting the braking surfaces 22, 23 out of engagement. The drum 30 is thus rotated until the lever 75 is returned to neutral, whereupon the spring 45 applies pressure through the flange 46, the thrust bearing plates 47, 48, 49, and the bolts 26, to reengage the brake surfaces 22, 23. The weight of the load rotates the drum in the opposite direction when the brake is released without engaging the clutch, and this is accomplished by swinging the lever 75 away from the clutch mechanism and applying pressure in opposition to the spring 45, through the cams 90, the plate 92, the sleeve 66, collar 70, sleeve 37, and flange 46. It will be noted that the spring 45 returns the lever 75 to neutral position from either the raising or lowering position of the latter, whenever the lever is released by the operator, thereby holding the load at any position when the lever is released.

It will be appreciated that any wear in any of the thrust bearings or friction surfaces will cause a slight shift of the driving and driven members axially relative to the shaft 6, and therefore relative to the cams 80 and 90. For instance, wear in the brake surfaces 22, 23 tends to cause the drum to shift slightly toward the lever 75, whereas wear in the clutch plates would tend to increase the clearance between the cams 80 and the thrust collar 85. Therefore, it is desirable that an adjustment be provided for shifting the lever with its pivot mountings toward and away from the clutch mechanism. This is accomplished by the adjusting mechanism, best shown in Figure 3. The outer end of the stationary shaft 6 is reduced in diameter as indicated at 95, which is slidably received within a bore 96 in a sleeve member 97. The outer end of the portion 95 is still further reduced in diameter and threaded as indicated at 98, and this portion 98 is threaded into the outer end of the sleeve 97, which is tapped to cooperate therewith. The sleeve member 97 is inserted through an aperture 100 in the vertical flange 101 of the angle iron bracket 16, and the inner end of the sleeve member 97 is provided with a radial flange 102, which bears against the inside of the flange 101 to limit outer movement of the sleeve 97 relative to the flange 101. The outer surface of the sleeve member 97 is threaded at 103 to receive a lock nut 104, which can be tightened thereon against the outer surface of the flange 101 on the support, while the outer end of the sleeve member 97 is provided with flat sides 105 adapted to receive a wrench for the purpose of threading the sleeve member 97 along the threaded end 98 of the shaft 6.

Thus, by applying a wrench to the sides 105 of the sleeve member 97, after the lock nut 104 has been loosened, the sleeve member 97 can be adjusted axially along the threaded end 98 in either direction to adjust the position of the shoulder 102 relative to the shaft 6. Since the opposite end of the shaft is held rigidly stationary by the bracket 12, whereas the angle iron support 16 is mounted on the upper end of a long and comparatively flexible standard 106, the angle iron 16, together with the pivot mounting of the lever 75 can be adjusted slightly with respect to the shaft 6, and thereby adjusting the cams 80 and 90 relative to the thrust collar 85 and plate 91.

I do not intend my invention to be limited to the exact details shown and described in connection with this embodiment, as various modifications within the scope of my invention will be apparent to those skilled in the art.

1. A clutch and brake assembly comprising a pair of driving and driven cooperative clutch members, a pair of cooperative brake elements, one of said elements being connected with said driven member, a spring for normally holding said elements in braking engagement, means for applying a force against said driving clutch member through said driven clutch member to oppose said spring and disengage said brake elements, and means for selectively applying a force independent of said driving clutch member to oppose said spring and disengage said brake elements.

2. A clutch and brake device as set forth in claim 1, characterized further in that said force applying means includes a lever having a mounting means providing for actuating movement in both directions from a neutral position, means connecting said lever with said driving member for applying force against the latter when said lever is actuated in one direction from said neutral position, and means connecting said lever with said driven member for applying force against the latter when said lever is actuated in the opposite direction from said neutral position.

3. A clutch and brake device comprising, in combination, a pair of driving and driven cooperative clutch members supported by means providing for rotation about a common axis and relative axial shifting movement to engage and disengage said members, a pair of brake elements disposed coaxially with said clutch members, one of said elements being stationary and the other of said elements being fixed to said driven member to rotate therewith and shiftable therewith axially relative to said stationary element to engage and disengage said elements, means normally biasing said elements into engagement, means at one end of said assembly for shifting said driving clutch member into engagement with said driven member and for exerting pressure therethrough to oppose said biasing means and disengage said brake elements, and means at said one end of the assembly and extending coaxially through said driving member for shifting said driven member to disengage said brake elements.

4. A rotary clutch and brake assembly comprising a supporting shaft, a pair of driving and driven cooperative clutch members supported by said shaft for rotation about the axis of the latter and shiftable axially relative to each other to engage and disengage said members, a pair of cooperative brake elements supported on said shaft and shiftable axially relative to each other to engage and disengage said elements, one of said elements being attached to said driven clutch member, means for applying a force against said driven member in one direction axially of said shaft to engage said brake elements, means for applying a force in the opposite direction to engage said clutch members and to disengage said brake elements, and means for selectively applying a force against said driven member in opposition to said first mentioned force applying means to disengage said brake elements without engaging said clutch members comprising a sleeve member mounted on said shaft within said clutch members and connected with one of said brake elements.

5. A rotary clutch and brake assembly comprising a stationary supporting shaft, sleeve means mounted thereon and shiftable axially relative thereto, a pair of driving and driven cooperative clutch members journaled on said sleeve means and shiftable axially relative to said shaft and to each other to engaged and disengaged positions, a pair of cooperative brake elements, one of said elements being fixed to said shaft and the other being attached to said driven clutch member to rotate and shift axially therewith to engage and disengage said brake elements and having a connection with said sleeve to shift axially therewith, spring means for normally biasing said brake elements into engagement to hold said driven member stationary, means for shifting said driving member axially into engagement with said driven member and to apply axial pressure in the same direction to shift the driven member to disengage said brake elements, and means for selectively shifting said sleeve axially to disengage said brake elements against the bias of said spring means.

6. A clutch and brake device as set forth in claim 5, characterized further in that said shifting and force applying means includes a lever having a mounting means providing for actuating movement in both directions from a neutral position, means connecting said lever with said driving member for applying a force against the latter when said lever is shifted in one direction from said neutral position, and means connecting said lever with said sleeve for applying force against the latter when said lever is actuated in the opposite direction from said neutral position.

7. In a clutch and brake assembly, a support, a stationary shaft mounted thereon, a driven clutch member rotatably mounted on said shaft, a stationary brake element rigidly attached to said shaft, a rotatable brake element connected with said driven member, a stationary helical spring encircling said shaft and anchored thereon, a thrust bearing for transmitting force from said spring to said driven member to shift the latter axially to interengage said brake elements, a driving clutch member rotatably mounted on said shaft and engageable with said driven member by shifting in a direction opposed to the pressure of said spring against said driven member, and control means shiftable in one direction from a neutral position to shift said driving clutch member into engagement with said driven member, and shiftable in the opposite direction to shift said spring away from said thrust bearing to relieve the spring pressure against said driven member, thus releasing pressure between said brake elements.

8. In a clutch and brake assembly, a support, a stationary shaft mounted thereon, a driven clutch member rotatably mounted on said shaft, an annular brake element fixed to said driven member and having an inner conical friction surface converging away from the latter, a brake drum rigidly mounted on said shaft and having a conical friction surface cooperative with said annular brake member, a helical compression spring encircling said shaft between said brake drum and said driven member and tending to force the latter axially away from said drum and thus apply said brake, and a driving clutch member rotatably mounted on said shaft on the opposite side of said driven member and shiftable axially toward the latter into driving engagement therewith.

9. In a clutch and brake assembly, a support, a stationary shaft mounted thereon, a driven clutch member rotatably mounted on said shaft, said driven member comprising a winding drum having a flanged portion at each end thereof, one of said flanged portions having a friction surface on the outer side thereof, a driving clutch member rotatably mounted on said shaft and having a friction surface cooperative with the first mentioned friction surface by relative movement of said members toward each other, a brake drum in the form of a bell shaped member disposed adjacent the opposite end of said winding drum and fixed to said support, said brake drum including an outwardly flared rim having a braking surface on the outer side thereof, an annular brake element fixed to the other flanged portion of said winding drum and embracing said brake drum, said annular element having a braking surface engageable with said braking surface by forcing said driven member away from said drum, and a helical compression spring encircling said shaft within said bell shaped member and adapted to urge said driven member axially away from said brake drum.

10. A rotary clutch and brake assembly comprising a stationary supporting shaft, sleeve means mounted thereon and shiftable axially relative thereto, a driven clutch member rotatably mounted on said sleeve means and comprising a winding drum having a flanged portion at each end thereof, one of said flanged portions having a friction surface on the outer side thereof, a driving clutch member rotatably mounted on said sleeve means and having a friction surface cooperative with the first mentioned friction surface by relative movement of said members toward each other, a brake drum rigidly mounted on said shaft adjacent the opposite end of said winding drum, an annular brake element fixed to the other of said flanged portions of the latter, said brake element and drum having cooperative conical braking surfaces adapted to interengage when said winding drum is shifted axially away from said brake drum, a flange fixed to said sleeve means adjacent said brake drum and adapted to bear against the end of said driven member, a helical compression spring disposed to bear against said brake drum at one end and against said sleeve flange and tending to force said winding drum away from said brake drum to engage said brake surfaces, flange means associated with said sleeve means at the opposite end of said winding drum and adapted to bear against the latter to shift the drum toward said brake drum to disengage said braking surfaces, and control means adjacent said driving member for selectively shifting said driving member or said sleeve means against said winding drum in opposition to said spring to release said braking surfaces.

11. A clutch and brake assembly as set forth in claim 10, further characterized in that said control means comprises a lever having a pivot mounting means providing for swinging movement in both directions from a neutral position, camming means on said lever on one side of said pivot and engageable with said driving member to shift the latter axially when the lever is swung in one direction, and camming means on said lever on the opposite side of said pivot and engageable with said sleeve means to shift the latter axially when the lever is swung in the opposite direction.

12. A clutch and brake assembly as set forth in claim 10, further characterized in that said control means comprises a lever having a pivot mounting means providing for swinging movement in both directions from a neutral position, camming means on said lever on one side of said pivot and engageable with said driving member to shift the latter axially when the lever is swung in one direction, camming means on said lever on the opposite side of said pivot and engageable with said sleeve means to shift the latter axially when the lever is swung in the opposite direction, and adjustable means for shifting said pivot mounting means axially relative to said support to compensate for wear in the friction surfaces and other parts.

13. A clutch and brake assembly comprising a pair of coaxial driving and driven cooperative clutch members, a pair of cooperative brake elements, one of said elements being connected with said driven member, a spring for urging said elements into braking engagement, a thrust bearing associated with said driving member, a control lever movable in one direction to transmit thrust through said thrust bearing to shift said driving clutch member into driving engagement with said driven clutch member in opposition to said spring to disengage said brake elements, and a control member extending coaxially through said driving clutch member and connected to said spring, said control member being shiftable axially relative to said driving clutch member to oppose said spring for relieving pressure against said brake elements, said control lever being movable in the opposite direction out of engagement with said thrust bearing to transmit force through said control member in opposition to said spring independent of said driving clutch member.

14. A clutch and brake assembly comprising a rotatable and axially shiftable driven member, an annular brake element fixed thereto and coaxial therewith, a second brake element disposed in relatively stationary position adjacent said annular element and arranged to coact with the latter to brake said driven member responsive to axial shifting movement of the latter in one direction relative to said stationary element, a spring adapted to urge said driven member in said direction to engage said brake elements, a rotatable driving member disposed adjacent said driven member and axially shiftable relative thereto, a pair of coactable clutch surfaces on said driving and driven members, respectively, and adapted to be engaged responsive to axial shifting movement of said driving member in the other direction in which an axial force transmitted through said clutch surfaces shifts said driven member to disengage said brake elements in opposition to said spring, a control lever shiftable in both directions from a neutral position in which said driven member is held stationary by said brake elements, means connecting said lever with said driving member to shift the latter axially to engage said clutch surfaces when the lever is shifted in one direction, and means extending axially through said driving member and shiftable axially relative thereto for connecting said lever with said driven member and said spring to oppose the latter and shift said driven member away from engagement with said driving member and said stationary brake element when the lever is shifted in the opposite direction.

15. The combination set forth in claim 14, including the further provision that said control lever is pivotally supported intermediate its ends for angular movement about an axis substantially perpendicular to the axis of rotation of said clutch members, said lever being engageable with said driving member at a point of contact spaced on one side of said lever axis and engageable with said axially extending connecting means at a point of contact spaced on the opposite side of said lever axis.

16. The combination set forth in claim 14, including the further provision that said control lever is pivotally supported intermediate its ends for angular movement about an axis substantially perpendicular to the axis of rotation of said clutch members, said lever being positioned adjacent said driving member, a thrust bearing between the latter and said lever, said lever having camming means fixed thereto spaced along said lever from said lever axis and adapted to bear upon said thrust bearing to shift said driving member when the lever is swung in one direction, and a second camming means fixed to said lever on the opposite side of said lever axis and adapted to bear upon said axially extending connecting means to shift said driven member when the lever is swung in the opposite direction.

17. A rotary clutch and brake assembly comprising a central control member disposed coaxial with the axis of rotation of said assembly, supporting means therefor providing for axial shifting movement of said member relative thereto, a driven clutch member supported on said control member and shiftable axially therewith, a driving member journaled for rotation on said control member and also shiftable axially relative thereto, a pair of cooperative clutch surfaces disposed on said driving and driven members, respectively, and coactable by shifting said driving member axially in one direction, a spring anchored to said support and adapted to urge said control member and said driven member axially in the opposite direction, a rotary brake element fixed to said driven member, a relatively stationary brake element mounted on said support and coactable with said rotary brake element to hold said driven member normally stationary, said brake elements being urged into engagement by said spring and thereby serving to limit axial movement of said driven member in said opposite direction but disengageable by force transmitted axially by said driving member through said clutch surfaces, and control means for selectively applying an axial force in opposition to said spring either through said driving member and clutch surfaces or through said control member, to disengage said brake elements.

18. A rotary clutch and brake assembly comprising a central control member disposed coaxial with the axis of rotation of said assembly, supporting means therefor providing for axial shifting movement of said member relative thereto, a driven clutch member supported on said control member and shiftable axially therewith, a driving member journaled for rotation on said control member and also shiftable axially relative thereto, a pair of cooperative clutch surfaces disposed on said driving and driven members, respectively, and coactable by shifting said driving member axially in one direction, a spring anchored to said support and adapted to urge said control member and said driven member axially in the opposite direction, a rotary brake element fixed to said driven member, a relatively stationary brake element mounted on said support and coactable with said rotary brake element to hold said driven member normally stationary, said brake elements being urged into engagement by said spring and thereby serving to limit axial movement of said driven member in said opposite direction but disengageable by force transmitted axially by said driving member through said clutch surfaces, and a control lever having pivotal mounting means intermediate its ends adjacent the outer ends of said driving member and said control member and swingable in one direction to engage said driving member on one side of said pivotal mounting means to apply an axial force thereagainst in opposition to said spring, and swingable in the opposite direction to engage the end of said control member on the opposite side of said pivotal mounting to apply an axial force thereagainst to oppose said spring and disengage said clutch elements independent of said driving member.

19. A rotary clutch and brake assembly comprising a central control member disposed coaxial with the axis of rotation of said assembly, supporting means therefor providing for axial shifting movement of said member relative thereto but preventing rotation of said control member, a driven clutch member journaled on said control member, means defining a pair of shoulders on said control member on opposite sides of said driven member between which the latter is freely rotatable about said axis of revolution, a pair of brake elements fixedly mounted on said driven member and said support, respectively, and interengageable to brake said driven member by axial movement of the latter in one direction, a spring anchored on said support and biased against said control member urging the latter axially in said one direction and transmitting force through one of said shoulders to engage said brake elements, a driving member journaled on said control member and shiftable axially relative thereto, a pair of cooperative clutch surfaces on said driving and driven clutch members, respectively, said surfaces being engageable in driving relation by shifting said driving clutch member against said driven clutch member in the other direction in opposition to said spring, said brake elements being disengageable by pressure exerted through said clutch surfaces, said driven member, and one of said shoulders, or through said control member directly, and control means at one end of said assembly adapted to apply an axial force in opposition to said spring, either through said driving member or through said central control member, selectively, for controlling said driven member in opposite directions, respectively.

20. A rotary clutch and brake assembly comprising a stationary shaft, a rigid support therefor, a control member slidably mounted in coaxial relation on said shaft and axially shiftable thereon, means preventing rotation of said control member on said shaft, a driven clutch member journaled on said control member, means defining a pair of shoulders on said control member on opposite sides of said driven member between which the latter is freely rotatable, a pair of brake elements fixedly mounted on said driven member and said shaft, respectively, and interengageable to brake said driven member by axial movement of the latter in one direction, a helical compression spring encircling said shaft and anchored to the latter, said spring being disposed to bear against said control member urging the latter axially along said shaft in said one direction and transmitting force through one of said shoulders to engage said brake elements, a driving member journaled on said control member and shiftable axially relative thereto, a pair of cooperative clutch surfaces on said driving and driven clutch members, respectively, said surfaces being engageable in driving relation by shifting said driving clutch member against said driven member in opposition to said spring, said brake elements being disengageable by pressure exerted through said clutch surfaces, said driven member, and one of said shoulders, or through said control member directly, and a control lever near the adjacent outer ends of said driving member and said control member and pivotally mounted on said support for swinging movement about an axis intermediate the ends of said lever, and means on said lever spaced on opposite sides of said axis and adapted to bear on said driving member and said control member, respectively, as the lever is swung in opposite directions, selectively.

HAROLD M. STUELAND.